(12) United States Patent
Beauchamp et al.

(10) Patent No.: US 11,484,944 B2
(45) Date of Patent: Nov. 1, 2022

(54) THREE-DIMENSIONAL PRINTER WITH TWO STATE FILTER FOR POWDERED METAL

(71) Applicant: 3D Systems, Inc., Rock Hill, SC (US)

(72) Inventors: Robert W. Beauchamp, Carlsbad, CA (US); Jonathan Watson, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 326 days.

(21) Appl. No.: 16/774,124

(22) Filed: Jan. 28, 2020

(65) Prior Publication Data

US 2020/0254523 A1    Aug. 13, 2020

Related U.S. Application Data

(60) Provisional application No. 62/803,841, filed on Feb. 11, 2019.

(51) Int. Cl.
| | |
|---|---|
| *B22F 10/20* | (2021.01) |
| *B33Y 10/00* | (2015.01) |
| *B33Y 50/02* | (2015.01) |
| *B33Y 30/00* | (2015.01) |
| *B33Y 40/00* | (2020.01) |
| *B22F 10/30* | (2021.01) |

(52) U.S. Cl.
CPC .............. *B22F 10/20* (2021.01); *B33Y 10/00* (2014.12); *B33Y 30/00* (2014.12); *B33Y 40/00* (2014.12); *B33Y 50/02* (2014.12); *B22F 10/30* (2021.01)

(58) Field of Classification Search
CPC ......... B33Y 10/00; B33Y 30/00; B33Y 40/00; B33Y 50/02; B22F 10/30
See application file for complete search history.

(56) References Cited

U.S. PATENT DOCUMENTS

| | | | |
|---|---|---|---|
| 8,794,263 | B2 | 8/2014 | Scott |
| 10,265,772 | B2 | 4/2019 | Mironets |
| 2018/0244034 | A1 | 8/2018 | Sutcliffe |

FOREIGN PATENT DOCUMENTS

| | | | |
|---|---|---|---|
| CN | 201811031555 | A * | 12/2018 |
| EP | 3221007 | B1 | 11/2019 |
| EP | 3431285 | B1 | 3/2020 |
| EP | 3221073 | B1 | 4/2020 |

OTHER PUBLICATIONS

CN201811031555A english translation (Year: 2018).*

* cited by examiner

*Primary Examiner* — Kevin E Yoon
*Assistant Examiner* — Ricardo D Morales

(57) ABSTRACT

A three-dimensional printing system for manufacturing three-dimensional articles includes an apparatus, a filtration system, and a controller. The apparatus is a fabrication system that generates ignitable powder dust in an inert atmosphere fluid stream. The filtration system receives the fluid stream and has a plurality of filter units in a parallel arrangement including at least a first filter unit and a second filter unit. The controller is configured to control the filtration unit and to thereby individually operate the plurality of filter units in two states including a filtration state and an oxidation state. When one of the plurality of filter units is operating in the filtration state another of the plurality of filter units is operating in the oxidation state.

15 Claims, 4 Drawing Sheets

THREE-DIMENSIONAL PRINTER WITH TWO STATE FILTER FOR POWDERED METAL

CROSS-REFERENCE TO RELATED APPLICATIONS

This non-provisional patent application claims priority to U.S. Provisional Application Ser. No. 62/803,841, Entitled "THREE-DIMENSIONAL PRINTER WITH TWO STATE FILTER FOR POWDERED METAL" by Robert W. Beauchamp et al., filed on Feb. 11, 2019, incorporated herein by reference under the benefit of U.S.C. 119(e).

FIELD OF THE INVENTION

The present disclosure concerns an apparatus and method for the digital fabrication of three-dimensional (3D) articles from ignitable powder materials. More particularly, the present disclosure concerns an apparatus to improve safety in using ignitable powders such as generally unoxidized metal powders.

BACKGROUND

Three dimensional (3D) printing systems are in rapidly increasing use for purposes such as prototyping and manufacturing. One type of three dimensional printer utilizes a layer-by-layer process to form a three dimensional article of manufacture from ignitable powdered materials. One example of ignitable powdered materials are powdered metals such as titanium powder in a generally unoxidized state. A three dimensional (3D) article is formed by (1) dispensing a layer of the powder, (2) selectively melting the layer of powder with an energy beam (e.g., high powered laser beam or electron beam), and (3) repeating the dispensing and selective melting to complete formation of the 3D article. Due to the ignitability of the powder, the process and powder handling are performed within an inert gas such as argon. During the processing and powder handling a powder dust can be generated which is then removed with a filter system. One danger is that the filter system can ignite and create a fire when the powder oxidizes.

SUMMARY

Figure 1:
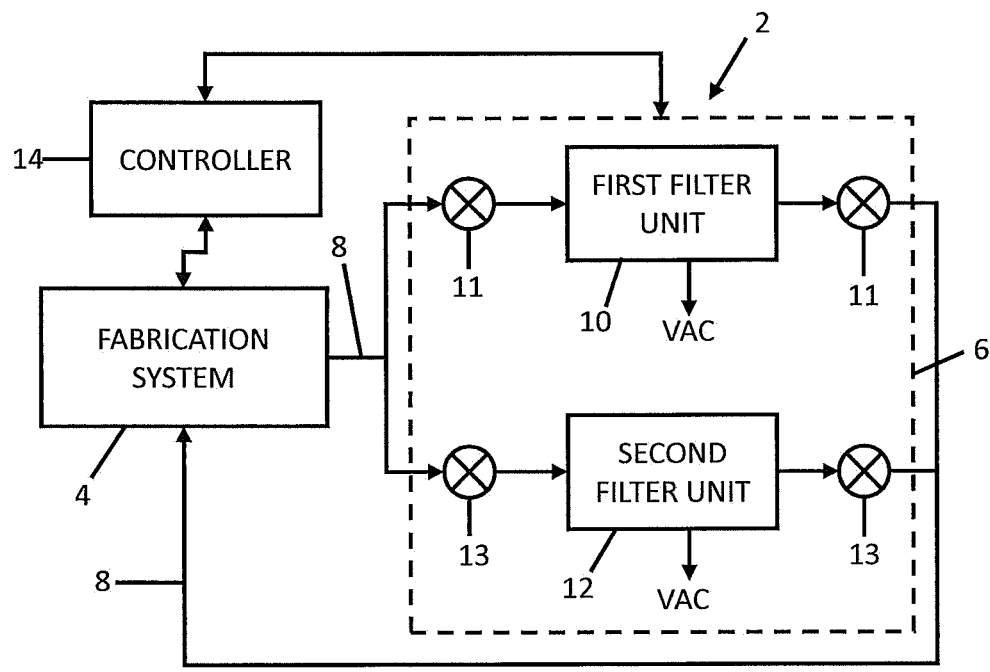
FIG. 1 is a schematic diagram of an embodiment of a three-dimensional (3D) printing system for fabricating a three-dimensional (3D) article through the processing of ignitable powder. In one embodiment, the ignitable powder is a metal powder such as titanium. The system includes a filtration system having a two parallel filter units.

In a first aspect of the disclosure, a three-dimensional printing system for manufacturing three-dimensional articles includes an apparatus, a filtration system, and a controller. The apparatus is a fabrication system that generates ignitable powder dust in an inert atmosphere fluid stream. The filtration system receives the fluid stream and has a plurality of filter units in a parallel arrangement including at least a first filter unit and a second filter unit. The controller is configured to control the filtration unit and to thereby individually operate the plurality of filter units in two states including a filtration state and an oxidation state. When one of the plurality of filter units is operating in the filtration state another of the plurality of filter units is operating in the oxidation state. The filtration unit operating in the filtration state is receiving the fluid stream and filtering out the ignitable dust particles. The filtration unit operating in the oxidation state is isolated from the fluid stream and controllably oxidizing ignitable powder held within to mitigate an ignition fire risk. The ignitable powder dust can be a generally unoxidized metal powder such as titanium powder. The fabrication unit can include an energy beam for selectively melting and fusing the metal powder. The energy beam can include one or more of a laser beam, a particle beam, and an electron beam.

In one implementation the following alternating sequence occurs: (1) During a first time period, the first filter unit is operated in the filtration state. (2) During a second time period the first filter unit is operated in the oxidation state while the second filter unit is operated in the filtration state. (3) During a third time period the second filter unit is operated in the oxidation state while the first filter unit is operated in the filtration state. This alternating sequence can repeat until one or more filtration units need to be exchanged.

In another implementation the plurality of filter units include a third filter unit. Three or more filter units allow one filter unit to be exchanged while at least two others operate.

In yet another implementation operation of the filter unit in the oxidation state includes introducing an oxidant into the filter unit. The oxidant can be one or more of ambient air and oxygen. Operation of the filter unit in the oxidation state can also include monitoring an oxygen concentration and/or a temperature within the filter unit. The oxygen concentration can be modulated in response to the temperature to prevent overheating of the filter unit.

In a second aspect of the invention, a method is provided for removing ignitable powder from a fluid stream of a three-dimensional printing system. The method includes: receiving the fluid stream into a filtration unit which includes a parallel arrangement of filter units including at least a first filter unit and a second filter unit; during a first time period operating the first filter unit in a filtration state during which the first filter unit is trapping the ignitable powder from the fluid stream; during a second time period that follows the first time period, operating the first filter unit in an oxidation state in which the first filter unit is isolated from the fluid stream and is oxidizing the ignitable powder trapped during the first time period; and during the second time period, operating the second filter unit in the filtration state.

DETAILED DESCRIPTION OF THE PREFERRED EMBODIMENTS

FIG. 1 is a schematic diagram of an embodiment of a three-dimensional (3D) printing system 2 for fabricating a three-dimensional (3D) article through the processing of ignitable powder. In one embodiment, the ignitable powder is a metal powder in a generally unoxidized state.

Within the disclosure, the term "generally" is defined as being so by design, but not necessarily exactly so. For example, generally unoxidized metal powder would be mostly unoxidized but may have some small or trace amount of metal oxide. Other uses of "generally" such as "generally vertical", "generally horizontal", or "generally aligned" would refer to being so by design to within manufacturing tolerances.

System 2 includes a fabrication system 4 coupled to a filtration system 6. In an illustrative embodiment, the fabrication system 4 forms 3D articles through a selective melting and fusion of metal powder. The selective melting is accomplished by the use of an energy beam such as a high powdered laser beam or an electron beam. During operation, the fabrication system 4 generates metal dust that needs to be removed. To remove the metal dust, a fluid stream 8 is established through the filtration system 6 within which the metal dust is captured. In the illustrated embodiment, the filtration system 6 includes two filter units in parallel including a first filter unit 10 and a second filter unit. 12 The filtration system also includes valves 11 and 13 for selectively coupling a filter unit 10 or 12 to the fluid stream 8 or alternatively for selectively isolating a filter unit 10 or 12 from the fluid stream 8. In other embodiments, a filter unit may have only one such valve for coupling or isolation.

A controller 14 is operably coupled to the fabrication system 4 and the filtration system 6. The controller 14 includes a processor coupled to an information storage device. The information storage device has a non-transient or non-volatile storage unit that stores software instructions. The software instructions, when executed by the processor, control components of the fabrication system 4 and the filtration system 6.

Figure 2:
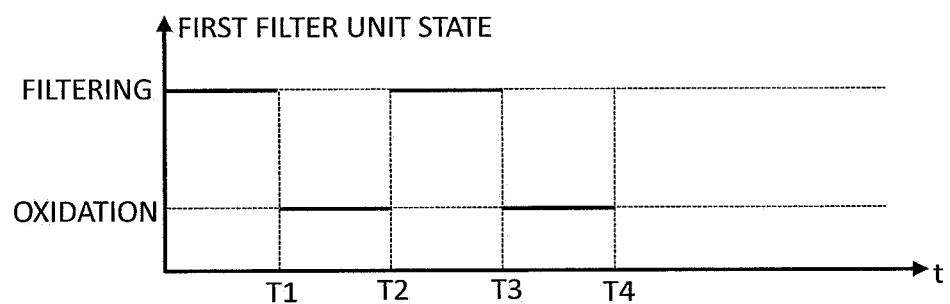
FIG. 2 is a timing diagram for a system having two parallel filter units that alternate between filtering and oxidation states. The time scale is not specified but can vary between hours or even days depending on filter capacity. In one embodiment, state transitions occur every 24 hours.
Figure 2:
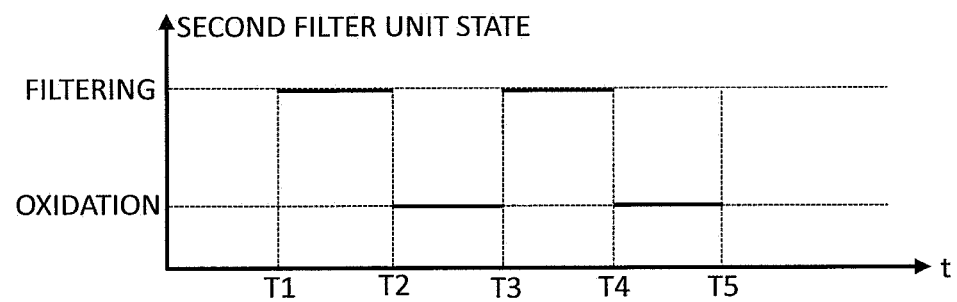

FIG. 2 depicts a timing diagram for the operation of the filtration unit 6 under control of the controller 14. The graphs depict individual states of filter units 1 and 2 versus a time t.

A first time period is depicted by a time between the graph origin (t=0) and a time t=T1. During the first time period, the first filter unit 10 is in a "filtering state." The valves 11 coupled to the first filter unit 10 are open. Thus the fluid stream 8 is passing through the first filter unit 10 which is removing metal dust from the fluid stream 8. The valves 13 coupled to the second filter unit 12 are closed, isolating it from the fluid stream 8.

A second time period is depicted by a time between t=T1 and t=T2. During the second time period, the first filter unit 10 is in an "oxidation state." The valves 11 coupled to the first filter unit 10 are closed and it is isolated from the fluid stream 8. During the second time period, metal powder in the first filter unit 10 is being oxidized. During the second time period, the second filter unit 12 is in the "filtering state" with the valves 13 open.

A third time period is depicted by a time between t=T2 and t=T3. During the third time period, the first filter unit 10 is in the filtering state and the second filter unit 12 is in the oxidation state. This process can continue, allowing filter units 10 and 12 to alternate between filtering and oxidation states.

A duration of the time periods can vary. In one embodiment, the time period is a shift, or about 8 hours. In another embodiment, the time period can be 24 hours. However, depending upon details of the system design, the time periods can vary between minutes and days.

During the oxidation state—for example, the second time period for the first filter unit 10—several operations occur: (1) First, the valves 11 are closed, isolating the first filter unit 10. (2) Next, captured ignitable powder in the first filter unit 10 is oxidized. As will be described further, this can be accomplished by introducing an oxidizing gas to the first filter unit 10. (3) After the oxidation is complete, a vacuum is drawn upon the first filter unit 10 to prepare for reconnection with the fabrication system 4. This sequence would also occur for the second filter unit 12 during the illustrated third time period.

Figure 3:
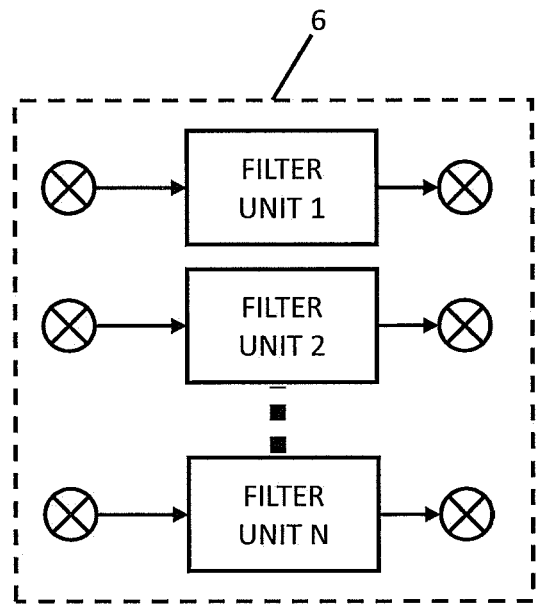
FIG. 3 is a schematic diagram depicting a filtration system having three or more filter units.

FIG. 3 generalizes the filtration unit 6 to N filter units in which N can be any number greater than 1. With more than two filter units it is possible to have one filter unit being removed and replaced while the other two are operational in the alternating states.

Figure 4:
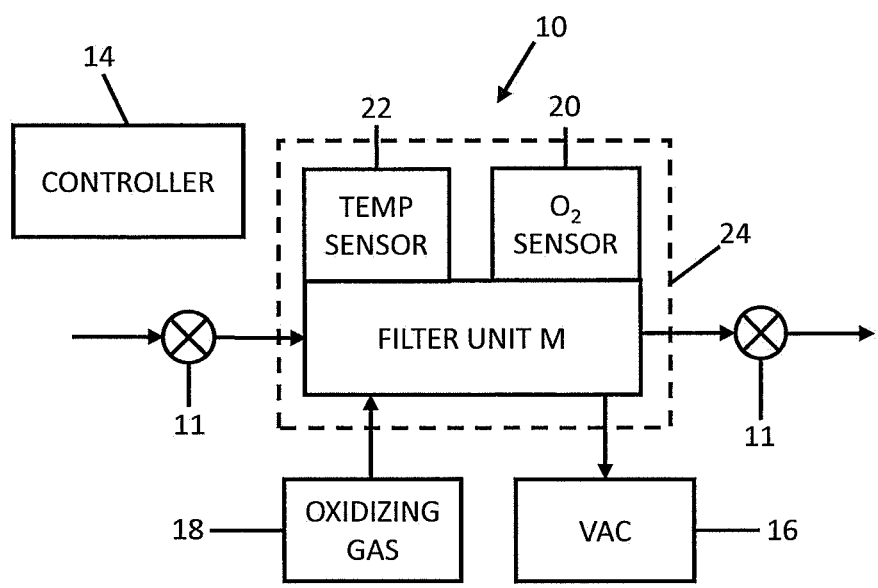
FIG. 4 is a schematic diagram of a single filter unit and illustrates features used for an oxidation state.

FIG. 4 is a schematic diagram depicting a single filter unit 10 with some additional features for supporting the oxidizing state. A vacuum source 16 and a source of oxidizing gas 18 such as ambient air or oxygen can be coupled to the filter unit 10. Filter unit 10 includes an oxygen sensor 20 and a temperature sensor 22. In some embodiments, a cooling (e.g., refrigeration) unit 24 surrounds or is thermally coupled to the filter unit 10. Controller 14 is coupled to valves 11 the vacuum source 16, the oxidizing gas 18, the oxygen sensor 20, the temperature sensor 22, and, optionally, the cooling unit 24.

Figure 5:
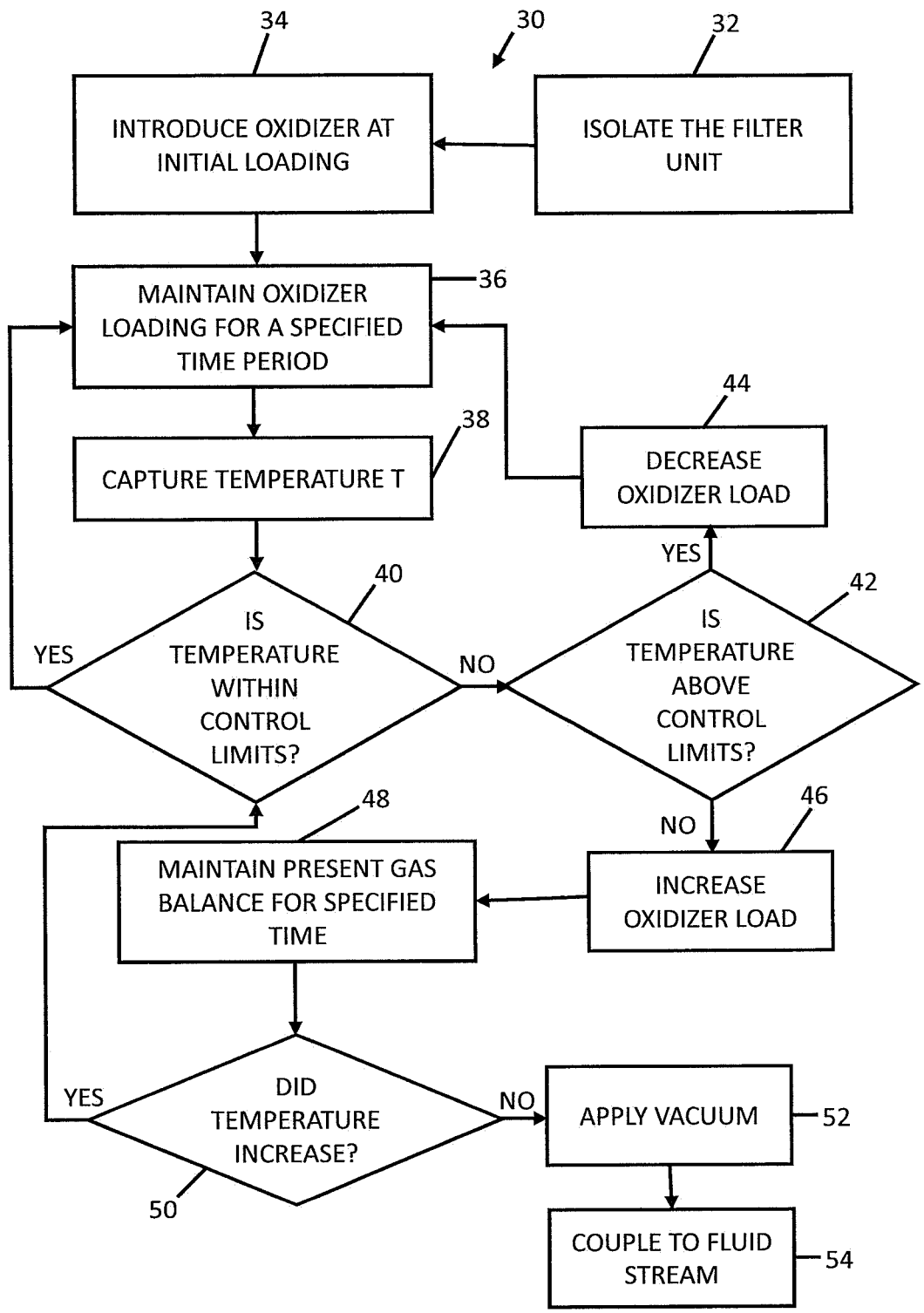
FIG. 5 is a flowchart of an embodiment of a method of operation of a filter unit during an oxidation state.

FIG. 5 is a flowchart depicting an embodiment of a method of manufacturing 30 for operating a filter unit 10 during the oxidation state. Method 30 can be fully automated by control of controller 14 or it can include some manual steps. According to 32, the filter unit 10 is fluidically isolated from the fluid stream 8. In some embodiments, the refrigeration unit 24 is also activated during step 32.

According to 34, the oxidizing gas source 18 is activated to fill the filter unit 10 with an initial oxidizer concentration. During 34 and subsequent steps, the oxygen sensor 20 is monitored to verify that a targeted oxidizer concentration is present in the filter unit 10. Typically the initial oxidizer concentration is relatively low to maintain the oxidation rate at a safe level to avoid excessive temperature excursions.

According to 36, the oxidizer loading is maintained for a specified time period so that any temperature changes have stabilized. Then according to 38, the temperature sensor 22 captures and reports a temperature value within the filter unit 10.

According to 40, a determination is made as to whether the temperature is within specified control limits (within a control limit range). If the temperature is within the control limits, the process moves back to step 36. The temperature being within control limits implies that oxidation is proceeding at a desired rate.

If, according to 40, the temperature is outside (higher or lower than) the control limit range, then the process proceeds to 42. If the temperature is above the control limit range, then the process proceeds to step 44 at which the concentration of oxidizer is reduced. Then the process moves to step 36 to allow the temperature to be checked again.

If at 42 the temperature is below the control limit range, then the process moves to step 46 at which the concentration of oxidizer is increased. According to 48 the temperature is allowed to stabilize before proceeding to step 50. At 50, the temperature is checked again.

If according to 50 the temperature has increased then the process moves to step 40. If, however, the temperature has not increased then that would imply that the temperature is falling because the oxidation process is complete. Then, according to 52, the vacuum source 16 is applied to the filter unit 10 before it is reconnected to the gas stream 8 at step 54.

Variations are possible. For example, after step 50 the process may include a delay and more oxidizer additions between step 50 and 52 to be sure that all of the ignitable powder is oxidized.

Figure 6:
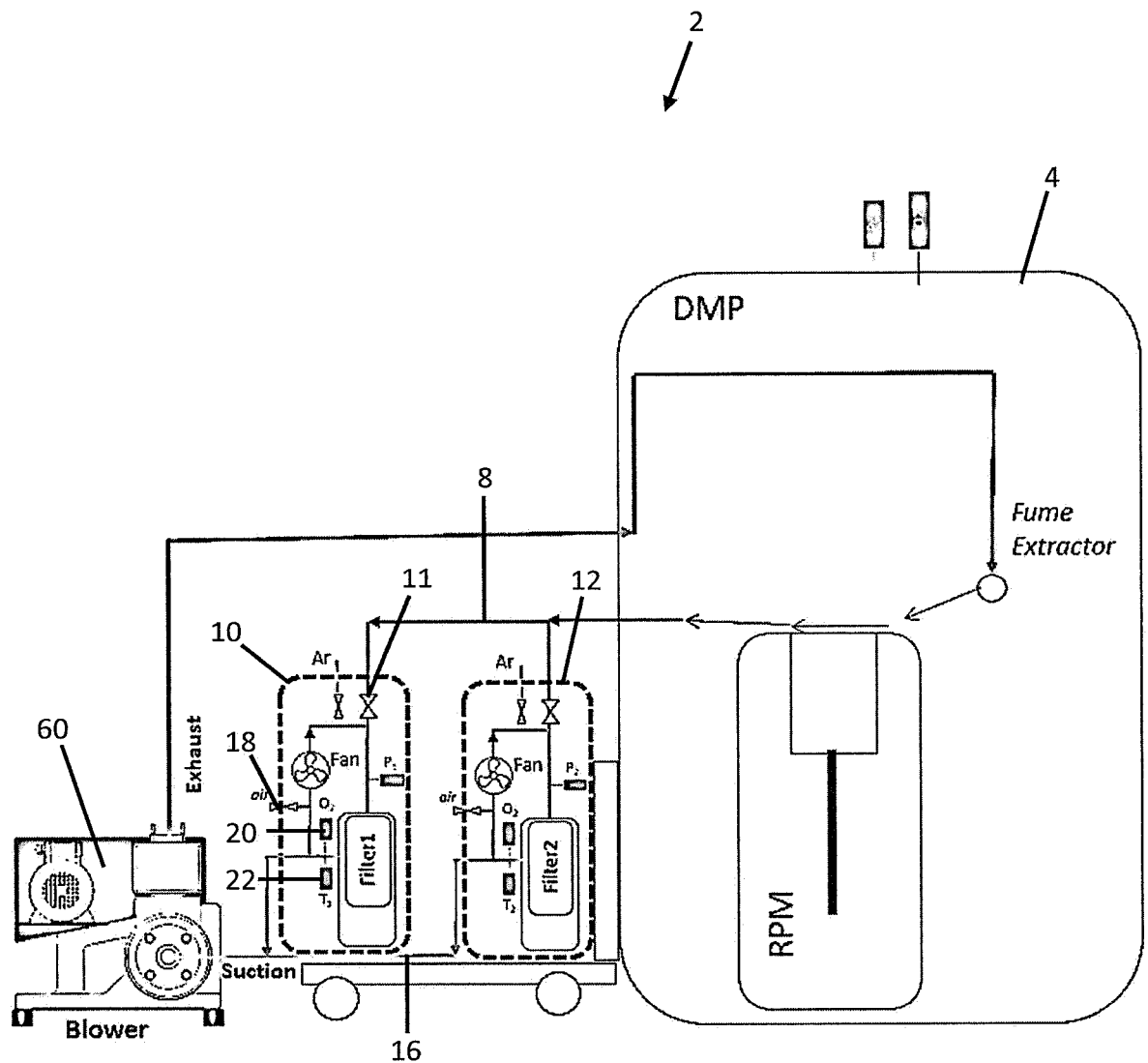
FIG. 6 is a diagram showing an implementation of a three-dimensional (3D) printing system using the functional features described in FIGS. 1-4 with some differences in implementation.

While FIGS. 1 and 4 are somewhat simplified schematic diagrams, FIG. 6 includes some added details for a system 2. Elements labelled in FIG. 6 have a similar function as those labeled in FIGS. 1 and 4. A suction from a large blower 60 functions as vacuum source 16. A valve 18 to ambient air functions as the oxidizing gas source 18.

The specific embodiments and applications thereof described above are for illustrative purposes only and do not preclude modifications and variations encompassed by the scope of the following claims.

What is claimed:

1. A three-dimensional printing system for manufacturing three-dimensional articles from ignitable powders comprising:
   an apparatus that generates ignitable powder dust in an inert atmosphere fluid stream;
   a filtration system receiving the fluid stream and having a plurality of filter units in a parallel arrangement including at least a first filter unit and a second filter unit; and
   a controller configured to control the filtration unit and to thereby individually operate the plurality of filtration units in two states including a filtration state and an oxidation state such that when one of the plurality of filter units is operating in the filtration state another of the plurality of filter units is operating in the oxidation state;
   the filtration unit operating in the filtration state is receiving the fluid stream and filtering out the ignitable dust particles;
   the filtration unit operating in the oxidation state is isolated from the fluid stream and is controllably oxidizing ignitable powder held within to mitigate an ignition fire risk.

2. The three-dimensional printing system of claim 1 wherein the ignitable dust is a metal powder.

3. The three-dimensional printing system of claim 2 wherein the apparatus includes an energy beam for melting metal powder, the energy beam is one of a laser beam and an electron beam.

4. The three-dimensional printing system of claim 1 wherein:
   during a first time period, the first filter unit is operated in the filtration state;
   during a second time period that follows the first time period, the first filter unit is operated in the oxidation state and the second filter unit is operated in the filtration state.

5. The three-dimensional printing system of claim 1 wherein the plurality of filter units include at least a third filter unit.

6. The three-dimensional printing system of claim 1 wherein operation in the oxidation state includes controllably introducing an oxidant into the filter unit.

7. The three-dimensional printing system of claim 6 wherein the oxidant includes one or more of oxygen and ambient air.

8. The three-dimensional printing system of claim 6 wherein operation in the oxidation state includes monitoring a temperature within the filter unit and modulating a concentration of the oxidant within the filter unit to maintain the temperature within a control limit range.

9. The three-dimensional printing system of claim 6 wherein operation in the oxidation state includes monitoring a concentration of the oxidant in the filter unit.

10. A three-dimensional printing system for manufacturing three-dimensional articles from ignitable powders comprising:
    an apparatus that generates ignitable powder dust in an inert atmosphere fluid stream;
    a filtration system receiving the fluid stream and having a plurality of filter units in a parallel arrangement including at least a first filter unit and a second filter unit, the filter units individually including a sensor;
    a controller configured to:
       operate the first filter unit in a filtration state during a first time period;
       operate the first filter unit in an oxidation state during a second time period which follows the first time period;
       operate the second filter unit in the filtration state during the second time period; and
       operate the second filter unit in the oxidation state during a third time period that follows the second time period;
    a filter operating in a filtration state receives and filters the ignitable powder from the fluid stream;
    a filter operating in the oxidation state is isolated from the fluid stream and receiving an oxidizing gas including oxygen to oxidize the filtered ignitable powder.

11. The three-dimensional printing system of claim 10 wherein the sensor is configured to measure a concentration of the oxidizing gas in the filter unit during the oxidation state.

12. The three-dimensional printing system of claim 10 wherein the sensor is configured to measure a temperature of the filter unit during the oxidation state.

13. The three-dimensional printing system of claim 10 wherein the controller is further configured to:
    apply a vacuum source to the first filter unit; and
    operate the first filter unit in the filtration state during the third time period.

14. The three-dimensional printing system of claim 10 wherein the controller is further configured to:
    during the oxidation state, monitor a signal from the sensor and introduce the oxidizer to the filter unit at a rate or concentration that is responsive to the signal.

15. The three-dimensional printing system of claim 14 wherein the signal is indicative of a temperature within the filter unit, the controller modulates the rate or concentration in response to the temperature.

* * * * *